United States Patent Office 3,846,269
Patented Nov. 5, 1974

3,846,269
METHOD FOR CONTINUOUS COATING OF POLYIMIDE BY ELECTRODEPOSITION
Norman E. Martello, Turtle Creek, and David C. Phillips, Pittsburgh, Pa., assignors to Westinghouse Electric Corporation, Pittsburgh, Pa.
Filed Apr. 19, 1972, Ser. No. 245,455
Int. Cl. B01k 5/02; C23b 13/00
U.S. Cl. 204—181                                    20 Claims

ABSTRACT OF THE DISCLOSURE

A coated electrical conductor is made by continuously passing a positively charged electrical conductor near a negatively charged electrode, in a bath of a conducting non-aqueous polyamic acid electrodeposition composition, comprising acid salt within a solvent mixture, wherein the current density between the conductor and negative electrode is sufficient to electrodeposit a coating on the conductor, and thereafter curing the coating to form a polyimide film on the conductor.

BACKGROUND OF THE INVENTION

When a direct current potential is applied across an emulsion, suspension or solution containing charged particles or molecules, the latter migrate toward the electrode bearing the opposite charge. This phenomenon is generally called electrophoresis and is utilized to apply coatings onto metallic surfaces for purposes of electrical insulation, paint priming, weather protection, and the like.

Most of the polymer electrophoretic deposition techniques followed in industry involve aqueous batch type systems. However, aqueous depositions are in general markedly affected and vitiated by the evolution of gases at the electrodes. This gas evolution, deriving from water electrolysis can result in heavily pitted polymer coatings which makes them particularly unsuitable for electrical insulation. Moreover, water emulsion systems are generally plagued by difficult-to-control surface tension, necessary pH conditions, and viscosity difficulties.

Polyimide resins have recently come into use as high temperature electrical insulating films. Polyimide films are generally produced by film casting of a non-aqueous solvent solution followed by a heat cure. Briefly, this involves dissolving a suitable polyamic acid polymer in a solvent, casting the solution uniformly upon a smooth surface and then slowly heating until a suitable polyimide insulating film is produced from the acid polymer derivative. A major problem with the solution casting method is that only relatively thin films (0.0001" for foil coatings) can be produced in a single coat. Heavier coating or film thickness requires a multicoat system with each coat being dried and cured before applying the subsequent coat. Difficulty is also encountered with uniform coating of corners and particularly of sharp edges. Uniform polyimide coverage of irregular-shaped objects has proved practically impossible by solution casting and expensive equipment costs are encountered in this method.

As a partial solution, batch electrophoretic deposition techniques have been developed for polyamide acids in a water emulsion system, as described in U.S. Pat. 3,537,-970. Such an aqueous polymer electrodeposition system, however still suffers the aforedescribed disadvantages of film pitting. Although most of the polymer electrophoretic deposition techniques applied in industry involve aqueous processes, a few organic batch systems such as those shown in U.S. Pats. 3,450,655 and 3,463,714, have also been used. These systems have involved vinyl resins, epoxy resins, and carboxyl-containing polymers and copolymers such as polyacrylic acid, vinyl acetate/maleic acid copolymers, ethylene/itaconic acid copolymers and ethylene/maleic acid polymers among others.

It has been found that a great number of variables exist in non-aqueous electrodeposited systems as regards the ratio between polymer and solvent and between solvents within the solvent system, and that each polymer used presents its own characteristic problems in its dilution or suspension and deposition, especially in a continuous electrodeposition system.

SUMMARY OF THE INVENTION

In accordance with this invention, it has been found that the foregoing difficulties may be overcome so that exposed portions of electrical conductors can be uniformly, heavily coated with good edge coverage and without pitting, in a single coating continuous operation by the electrodeposition of a polyamic acid from a non-aqueous composition followed by imidizing, generally by a heat cure, to produce the corresponding polyimide. The composition used in the continuous method of this invention comprises a polyamic acid polymer, a nitrogen containing base which reacts with the acid to form a salt and a dual solvent system consisting of a liquid, organic, non-aqueous solvent for the acid and a liquid, organic, non-aqueous, non-electrolizable non-solvent for the salt of the acid.

The metal wire, ribbon, or other article that is a conductor of electricity and is to be coated, is charged positively with direct current by means of a d.c. power supply to make it function as an anode of a two electrode system. The other electrode, namely the cathode, is mounted in the bath of the electrically conducting non-aqueous coating composition and is charged negatively, to provide a current density, at any point in time, between the conductor surface opposite the cathode and the negative electrode (cathode) sufficient to electrodeposit a coating on the conductor (anode). The current density must be between about 2 to 10 mA./sq. in. of surface, i.e., cathode surface plus conductor surface opposite the cathode. The positively charged wire or ribbon is passed through the bath and between or by the electrodes, at between about 5 to 20 ft./min. Passage near or by the electrodes is about 3 to 15 seconds. The coated wire or ribbon is then continuously cured, to convert the coating to a polyimide, generally by means of a heat source such as a hot air or microwave oven.

Such a process is particularly suitable for coating resistor elements for circuit breakers. These resistors control switching surges and generally consist of ten 532 fold elements mounted on Teflon plates and connected in series to produce a single resistor assembly. The elements coated by this method are compatible with $SF_6$, and the products of arced $SF_6$, are thermally stable between $-50°$ C. to $375°$ C., have heavy edge coverage and are flexible enough to be folded without cracking.

BRIEF DESCRIPTION OF THE DRAWINGS

For a better understanding of the invention, reference may be made to the preferred embodiments, exemplary of the invention, shown in the accompanying drawings, in which.

DESCRIPTION OF THE PREFERRED EMBODIMENTS

Figure 1:
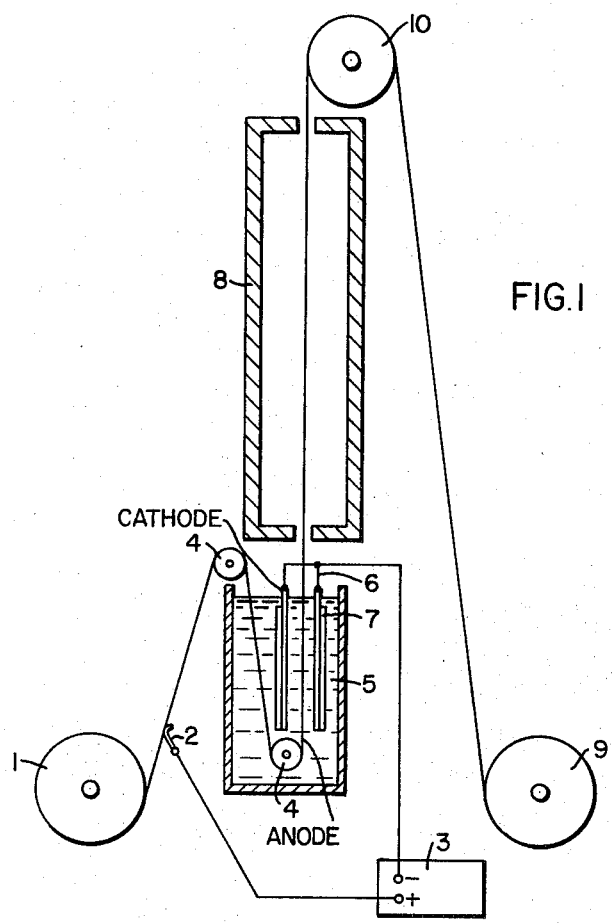
FIG. 1 is a schematic drawing of the continuous coating process of this invention.

One of the cured imide films, after electrodeposition of polyamic acid polymer and subsequent heating in accordance with this invention comprises polymers of aromatic polyimides having the recurring unit:

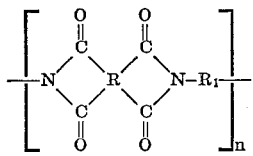

wherein $n$ is at least 15, R is at least one tetravalent organic radical selected from the group consisting of:

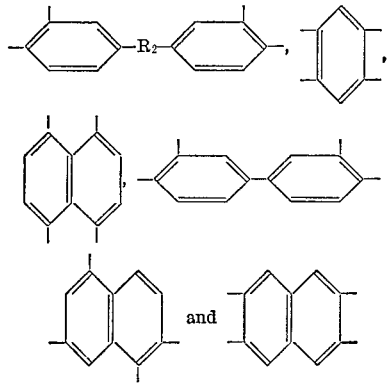

$R_2$ being selected from the group consisting of divalent aliphatic hydrocarbon radicals having from 1 to 4 carbon atoms and carbonyl, oxy, sulfo and sulfonyl radicals and in which $R_1$ is at least one divalent radical selected from the group consisting of:

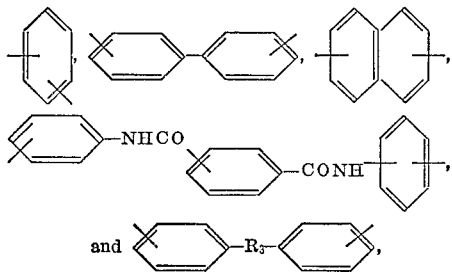

in which $R_3$ is a divalent organic radical selected from the group consisting of $R_2$, silico and amido radicals. Polymers containing two or more of the R and/or $R_1$ radicals, especially multiple series of $R_1$ containing amido radicals, are particularly valuable in some instances. The aromatic polyamide-imide resins, represented by certain of the foregoing formulae are described and claimed in U.S. Pat. No. 3,179,635.

The described essentially insoluble, cured, high temperature films are derived from certain soluble aromatic polyamic acids in solvent solution. In the present invention the polyamic acid is reacted to form a salt in a dual solvent system. The film after application to a suitable metal wire or ribbon or other type electrically conductive substrate by electrodeposition methods is heated for a time sufficient to cure the precursor film to its solid resinous state.

In general, the soluble polyamic acid precursors are prepared by admixing a suitable aromatic tetracarboxylic dianhydride with an aromatic diamine in a suitable solvent at room temperature. The admixture or solution is stirred until a maximum viscosity is reached. Examples of suitables dianhydrides are pyromellitic dianhydride, benzophenone tetracarboxylic dianhydride, naphthalene tetracarboxylic dianhydride and the like. Examples of suitable diamines are m-phenylene diamine, methylene dianiline, diaminodiphenyl ether, diaminobenzanilide and the like. References which describe the procedure in greater detail are U.S. Pats. 3,179,635; 3,179,614; 3,179,631; 3,179,632; 3,179,633 and 3,179,634. The polyamic acid precursors are well known and commercially available in solvent solutions.

The same general procedure is employed when a derivative of an aromatic tricarboxylic anhydride, e.g. trimellitic anhydride chloride or the ester diacid chloride of trimellitic anhydride is used in place of the aforesaid aromatic dianhydride. The above-named diamines are, of course, also suitable for use with the tricarboxylic anhydride derivatives.

One of the aromatic polyamic acid polymers suitable for use as a soluble polyamide acid precursor in this invention has the recurring unit:

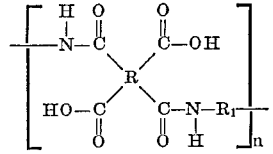

in which $n$ is at least 15 and R and $R_1$ are identical to the description hereinabove relating to the solid aromatic polyimide and polyamide-imide resins. It should be understood that suitable polyamic acids may also contain two or more of the R and/or $R_1$ radicals.

Suitable solvents for the polyamic acids are aprotic solvents, i.e. solvent which will neither lose a portion to the solute nor gain a portion from the solute for example, the normally liquid organic solvents of the N,N-dialkylcarboxylamide class, preferably the lower molecular weight members of this class, such as dimethyl acetamide, dimethyl formamide, and N-methyl-2-pyrrolidone. Other useful aprotic solvents include dimethyl sulfoxide and pyridine. The solvents can be used individually or in combinations of two or more. The solvents are easily removed by heating in a drying tower or oven.

In addition to the aforementioned aromatic polyimide and polyamide-imide recurring unit wherein R was a tetravalent organic radical other cured resins which are particularly suitable as films which can be electrodeposited in accordance with this invention are derived from a trivalent anhydride and have the structure:

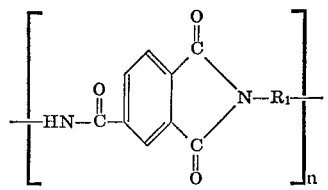

wherein $R_1$ and $n$ are identical to the description hereinabove relating to the solid aromatic polyimide and polyamide-imide resins.

Particularly valuable films are provided when $R_1$ is:

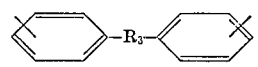

where $R_3$ is an oxy or methylene ($-CH_2-$) radical.

The soluble polyamic acid precursors for the above trivalent derived polyamide-imide resins include in repeating form one or both of the structures:

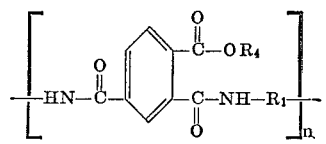

and

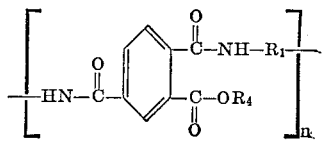

wherein $R_1$ and $n$ are identical to the description hereinabove and $R_4$ is selected from the group consisting of —H alkyl or aryl radicals. For details on the preparation of these soluble polyamic acids and the solid resins therefrom, reference may be had to British Pats. 1,056,564 and 1,032,649. The same solvents as previously described can be used for the above aromatic polyamic acids.

In the process of this invention, polyamic acids have been successfully electrodeposited from colloidal dispersions and pure solutions of amine salts of the same polyamic acids in mixed organic solvent systems. The colloidal composition consists of a colloidal dispersion of the amine salt of the polyimide precursor within a critically balanced organic solvent mixture and has a pH range between 8–10.

The chemical process is highly complex and probably involves polymer salt formation:

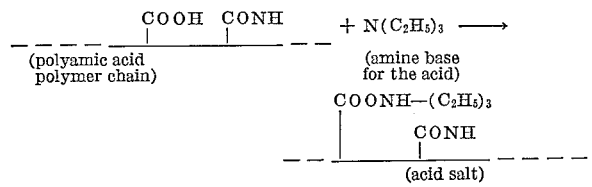

Under the influence of an electric field it is envisaged that the salt ionizes to produce the triethylammonium ion and carboxyl ion of the polymer which subsequently migrate to cathode and anode respectively:

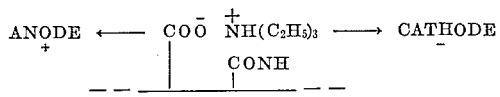

Anode reactions lead to the reconstruction of the parent polyamic acid, which on subsequent imidization, generally by a heat cure loses water to produce the corresponding polyimide film. Possible anode reactions are:

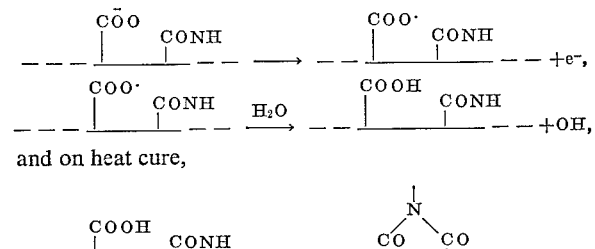

Although the colloidal composition is preferred for coating resistor ribbons because of a very heavy edge coverage which is considered advantageous, where a uniform coverage is required on ribbon, a non-colloidal pure solution can be used in the electrodeposition bath. The non-colloidal pure solution consists of the amine salt of the polyimide precursor in solution in two critically balanced organic solvents and has a pH range between 8–10.

The non-aqueous medium in which the acid salt is dispersed in either composition consists of a liquid non-electrolizable solvent which is not capable of dissolving the acid salt of the polymer chain. This non-solvent for the acid salt polymer must not gas to any great extent at the electrodes due to electrolysis when a voltage is applied to the system. Preferred solvents are non-electrolizable solvents which are a non-solvent for the acid salt of the polymer and would include liquid aliphatic (straight and branched chain) and aromatic ketones, such as, for example, acetone, methyl isobutyl ketone, methylethylketone, methyl n-propylketone, diethylketone, mesityloxide, cyclohexanone, methyl n-butyl ketone, ethyl n-butyl ketone, methyl n-amyl ketone, acetophenone, methyl n-hexylketone, isophorone and di-isobutylketone.

The basic organic nitrogen containing compounds which react with the acid polymer to form a stable acid salt include organic tertiary aliphatic and aromatic amines such as, for example trimethylamine, triethylamine, N,N-dimethylbenzylamine, tri-n-propylamine, tri-n-butylamine, N-ethylpiperidine, N-allylpiperidine, N-ethylmorpholine, N,N-diethyl-m-toluidine, N,N-diethyl-p-toluidine, N-allylmorpholine, N,N-diethylaniline, pyridine and imidazoles such as, for example imidazole 1-methylimidazole, 4-methylimidazole, 5-methylimidazole, 1-propylimidazole, 1,2-dimethylimidazole, 1-ethyl-2-methylimidazole and 1-phenylimidazole.

In preparation of the conducting electrodeposition composition the component materials must be added within critical wt. percent ratios. The process for preparing the colloidal dispersion consists of (1) reacting a polyamic acid polymer in a non-aqueous organic solvent solution, which is preferably non-electrolizable, with a nitrogen containing base selected from the group consisting of amines and imidazoles to form an acid salt, (2) adding the salt solution to a non-aqueous, organic non-solvent for the polyamic acid salt which is substantially non-electrolizable to provide the colloidal dispersion of the salt within the solvent mixture.

The colloidal electrodeposition composition is formed by addition of about 1 part by weight polyamic acid polymer about 29–37 parts solvent for said acid, about 0.8–1.2 parts nitrogen containing base and about 50–150 parts non-solvent for the salt of the acid. Under 29 parts solvent for the polymer will cause viscosity problems and precipitation and over 37 parts solvent for the polymer will impede electrocoating because the polymer will stay in solution. Under 50 parts non-solvent for the acid salt will impede electrocoating because the polymer will stay in solution. Over about 150 parts non-solvent for the acid salt will cause precipitation of the polymer within the two solvent medium.

The process for preparing the non-colloidal pure solution consists of (1) reacting a polyamic acid polymer in a non-aqueous, organic, solvent solution, which is preferably non-electrolizable, with a nitrogen containing base selected from the group consisting of amines and imidazoles to form an acid salt, (2) adding a non-aqueous, organic, non-solvent for the polyamic acid salt which is substantially non-electrolizable, dropwise to the salt solution, so as to just keep the salt in solution and prevent its precipitation.

The non-colloidal electrodeposition composition is formed by addition, in critical proportions, of about 1 part by weight polyamic acid polymer, about 12.5 to 15.5 parts solvent for said acid, about 0.8–1.5 parts nitrogen containing base and about 7 to 9 parts non-solvent for the salt of the acid. An excess of solvent for the polymer will keep the polyamic acid from coming out of solution at the electrode thus preventing electrodeposition. An excess of non-solvent for the polymer causes immediate precipitation of the polyamic acid salt within the bath medium.

Substitution of any compounds which are electrolizable, such as ammonium hydroxide inorganic type base, water, methanol, ethanol and aqueous sodium or potassium hydroxide for the solvents or bases described above, will cause pitting in the final electrodeposited film. Small effective amounts of filler particles, as such, or as finely divided pigments or lubricants can be added to these compositions for a variety of end uses such as colored coated ribbon or thin antifriction films.

As shown in FIG. 1 of the drawings, aluminum, copper, nickel, stainless steel or other metal wire, ribbon, foil or other suitable electrical conductor is fed from unwind reel 1, in one embodiment of this invention. The article to be coated could also be moved by means of attaching it to a movable belt passing through the electrodeposition composition. The article is charged positively at point 2 with direct current by D.C. power supply means 3, and fed around insulated pulleys 4 through the conducting polyamic acid salt electrodeposition bath 5. The bath may be either a colloidal dispersion of the organic salt of a polyimide precursor or a pure solution of the organic salt of a polyimide precursor. The bath will have a pH of from about 8-10 and is maintained at between about 20° to 45° C.

The ribbon is pulled through negative electrode 6 which may be circular but consists preferably of two flat plates of aluminum or copper mounted between about 0.5" to 4.0" apart and connected at the top to maintain uniform electrode spacing and electrical contact. Preferably, the back of the electrode (cathode) is coated with polyethylene or polyimide resin 7 to permit exposure of only the electrode face to the coating composition.

Ribbon speed by or through the negative electrode can vary between about 5 to 20 ft./min., with the applied potential difference being between about 50 to 250 volts, to provide a current density between the moving conductor (anode) and stationary electrode (cathode), at any point in time, of between about 2 to 10 mA./sq. in. of electrode plus conductor surface. Within these ranges and with a ribbon retention time in the bath of between about 6 to 24 seconds and a ribbon passage time between the electrode of about 3 to 15 seconds, films of polyimide resin from 0.5 to 2.5 mils (after cure) can be coated on the ribbon or other article. Under a current density of about 2 mA./sq. in. the coatings will be too thin and pinhole free coatings are not achieved and over about 10 mA./sq. in. the coatings will not cure easily.

The coated ribbon is then passed through curing oven 8 which may be a microwave oven or a two zone hot air oven having a bottom temperature between about 250° F. and 325° F. and a final temperature at the top between about 600° F. and 875° F. The oven length can vary but will usually range between about 10 to 30 feet. The coated cured ribbon is then wound onto winding reel 9 after passing over pulley 10.

Figure 2:
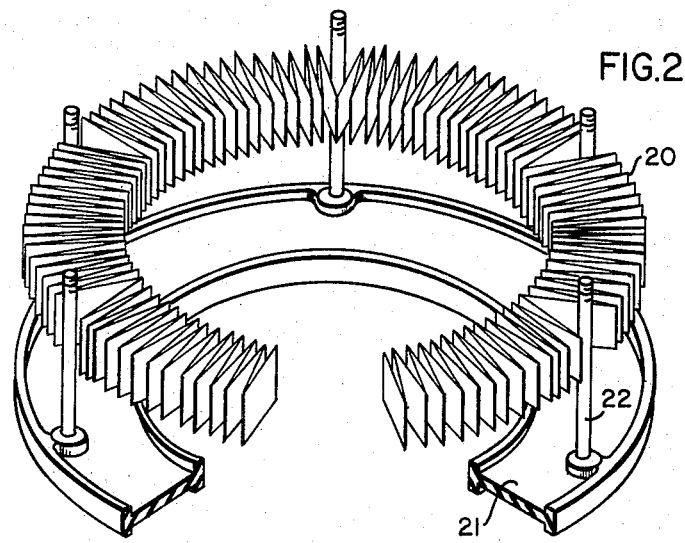
FIG. 2 is a view of an electrocoated resistor element mounted in a Teflon plate.

This process will provide, in one instance, the polyimide coated, cured, low inductance resistor element shown as 20 in FIG. 2. These resistors consist of units of folded ribbon 20 in a circular configuration and mounted on Teflon (polytetrafluoroethylene) plates or spacers 21. These Teflon-resistor plates are connected and superimposed in series by bolts or studs 22 for use in circuit breakers to control switching surges.

EXAMPLE 1

A polyamic acid electrodeposition composition was formed by: (1) mixing 61 grams of polyamic acid polymer dissolved in 309 grams of solvent for the polymer (350 ml. of a polyimide wire enamel solution having 16.5 wt. percent solids content and sold commercially by DuPont under the trade name Pyre M. L. Polyimide Wire Enamel) with 1533 grams (1400 ml.) of dimethylsulfoxide solvent for the polymer; adding 72 grams (70 ml.) of 1-methylimidazole dropwise to produce the amine salt having free carboxyl groups present. The resulting solution, containing 1.18 parts by weight organic base and 30 parts by weight combined solvent for the polymer to 1 part acid polymer, was vigorously stirred, heated to about 40° C., and held at that temperature for 20 minutes; (2) this solution was added, with vigorous stirring, to 3200 grams (4000 ml.) of acetone, a non-solvent for the acid salt to provide a composition containing 52.5 parts by weight non-solvent for the polymer to 1 part acid polymer. This provided about 7 gallons of colloidal composition having a pH about 8-10.

This colloidal composition was added to a tank fabricated from aluminum plate 6" x 8⅜" x 14" high with anodized inside surfaces to prevent deposition on the tank walls. A Micarta laminated plastic pulley was mounted inside the tank and also on the top edge of the tank as shown in FIG. 1, so that the steel ribbon could be led into the tank for coating. Inside the tank, and about 1" from the tank bottom, two flat aluminum electrode (cathode) plates 3/16" x 1½" x 16⅛" long, fixed into a recessed block of polyethylene were used. These permitted exposure only of the electrode face to the colloidal coating composition. These electrodes were held vertically in place by a flat Micarta laminated plastic block set in the bottom of the tank. The purpose of suspending these electrodes in the tank with a laminated plastic plate was to insulate them from the metal tank walls. The exposed electrode, above the polyethylene mounts were bolted together at the top to maintain uniform electrode spacing and electrical contact between the two electrode plates.

The steel ribbon was threaded through the tower oven by unwinding it from the reel on the unwind stand, through a fixed loop of copper wire, over the pulley on the top edge of the tank into the tank and underneath the pulley in the well up through the center of the suspended aluminum electrode and into the tower oven where the resin cure occurred. At the exit slot at the top of the oven, the coated ribbon was led over a 30" diameter pulley, down the outside of the tower oven, underneath a 6" diameter Micarta plastic laminate pulley to change ribbon direction and then to the windup capstan for winding up onto a reel. A schematic representation of the entire process is shown in FIG. 1.

The purpose for threading the ribbon through the copper loop was to make electrical contact with the D.C. power source for energizing the ribbon with a positive charge. The aluminum electrode suspended in the dip tank was energized with a negative charge. Close proximity of the positive electrode as represented by the steel ribbon surface opposite the negative electrode, and the negative electrode, as represented by the aluminum electrode, was necessary in order to develop sufficient throwing power for the electrodeposition process.

The equipment used to provide the D.C. potential for the process was a Kepco Power Supply (SM160-4AM) which was capable of generating 0-4 amperes at 0-160 volts. The ribbon used was ½" x 0.014" stainless steel, having rounded machined edges. Ribbon speed was maintained at 6 ft./min. and resulted in retention time of the ribbon in the coating bath of approximately 11 seconds. Total coating time for two 1200 ft. reels of ribbon was 5½ hours. The electrode separation distance was 1½".

A potential difference of 100 volts D.C. was applied, to provide a current density between the conductor and electrode of 5 mA./sq. in. Under the influence of the electric field it is envisaged that the salt ionizes to produce the triethylammonium ion and carboxyl ion of the polymer which subsequently migrates to cathode and anode respectively. During the run the voltage was slowly raised to a level of 150 volts D.C. whereupon additional solution was added to reduce the voltage and maintain a currenty density of about 5 mA./sq. in. To maintain uniform resin deposition on both sides of the ribbon, it should be spaced equidistant between the two electrodes as it moves vertically through the bath dispersion.

Tower oven temperatures were set at 250° F. in the bottom zone and 875° F. in the top zone. Total oven length was 24 feet. The coated ribbon was passed through the forced hot air oven and the resin was cured to form a tough, flexible, pinhole free polyimide coating between 0.45 to 1 mil thick on each side of the ribbon. The ribbon edge coverage was slightly heavier than the flat coverage resulting in a slight dog bone cross section for the coated ribbon. The coated ribbon was then passed to a windup reel.

To obtain maximum coating hardness, the cure of the polyimide resin must be at a final temperature of about 825° F. rather than a low temperature partial cure followed by a subsequent final high temperature cure. Tests were run to determine if the electrocoated ribbon could be folded into resistor sections without excessive damage to the coating and results indicated no abrasion breaks on the sides of the ribbon and only some extremely fine breaks on the edges of the crests of the folds, which could be eliminated with adjustment of the folding machine dies.

The final requirement for the electrocoated ribbon was that the folded resistor sections could withstand the electrical stress anticipated in service. For this test work, a single layer of 532 ribbon folds were encased between two Teflon resistor plates and terminals were welded on the ends of two adjacent 60 fold sections. $SE_6$ gas at 1 atmosphere flowed around the prototype resistor during test. As stated above, this polyimide electrocoated ribbon had some breaks due to the hammering imposed on it by the folding machine. The tests were at the 700 ampere level and the resistor passed 1350 amperes at 14,400 volts with sparkover at 1600 amperes at 14,400 volts.

Considering the fact that the resistor sections had some breaks in the coating, the electrical withstand values were extremely encouraging. A final series of electrical breakdown tests was made on short sections of Pyre-M.L. coated ribbon from the example. In these tests, short time dielectric strength of the coating was determined on unfolded ribbon. Six samples tested gave average values of 7000, 7500, 6700, 7200 and 7400 volts per mil for the dielectric strength of the coating. These values compare favorably with the typical value of 7000 volts per mil for 0.5 mil thick solution cast polyimide film.

It was found that when the acetone component of the composition was replaced by water, the polyimide coatings that are formed are heavily pitted, even when very low potential differences are applied, due to water electrolysis (gaseous products) at the anode, making the coatings disadvantageous for electrical applications in contrast to the coatings of Example 1.

We claim as our invention:

1. A method of coating a metallic electrical conductor comprising the steps of:
   (A) continuously passing positively charged electrical conductor near a negatively charged electrode in a bath of a conducting non-aqueous polyamic acid colloidal electrodeposition composition, said colloidal electrodeposition composition comprising acid salt within a solvent mixture, said acid salt being the reaction product of a polyamic acid and a basic organic nitrogen containing compound, said colloidal electrodeposition composition comprising about 1 part by weight polyamic acid, about 0.8 to about 1.2 parts by weight basic organic nitrogen containing compound, about 29 to about 37 parts by weight non-aqueous, organic solvent for the acid and about 50 to about 150 parts by weight non-aqueous, organic, non-solvent for the salt, wherein the current density between the conductor and negative electrode is sufficient to electrodeposit a coating on the conductor, and
   (B) curing the coating to form a polyimide film on the conductor.

2. The method of claim 1 wherein the continuously moving conductor passes by the negative electrode for about 8 to 20 seconds, the current density is between about 2 to 10 mA./sq. in. of negative surfaces plus conductor surface opposite the negative electrode, the pH of the bath is between about 8–10 and the solvent for the acid, non-solvent for the salt and basic nitrogen containing compound are non-electrolizable.

3. The method of claim 1 wherein the nitrogen containing compound is selected from the group consisting of amines and imidazoles, non-solvent for the salt is a ketone, and the coating is cured by passing the conductor through a heat source to heat the coating.

4. The method of claim 2 wherein the coating is cured by passing the conductor through a hot air oven at an initial temperature of about 250°–325° F. and a final temperature between about 699°–875° F.

5. The method of claim 2 wherein the negative electrode comprises two connected plates mounted about 0.5″–4.0″ apart and connected to a D.C. power supply means.

6. The method of claim 3 wherein the basic organic nitrogen containing compound is selected from the group consisting of trimethylamine, triethylamine, N,N-dimethylbenzylamine, tri-n-propylamine, tri-n-butylamine, N-ethylpiperidine, N-allylpiperidine, N-ethylmorpholine, N,N-diethyl-m-toluidine, N,N-diethyl-p-toluidine, N-allylmorpholine, N,N-diethylaniline pyridine, imidazole, 1-methylimidazole, 4-methylimidazole, 5-methylimidazole, 1-propylimidazole, 1,2-dimethylimidazole, 1-ethyl-2-methylimidazole and 1-phenylimidazole and the non-solvent for the salt is selected from the group of ketones consisting of acetone, methyl isobutyl ketone, methyl ethyl ketone, methyl n-propyl ketone, dimethyl ketone, mesityloxide, cyclohexanone, methyl-n-butyl ketone, ethyl-n-butyl ketone, methyl-n-amylketone, acetophenone, methyl-n-hexyl ketone, isophorone and di-isobutyl ketone.

7. The method of claim 3 wherein the polyamide acid is selected from the group of polyamide acids having the structure:

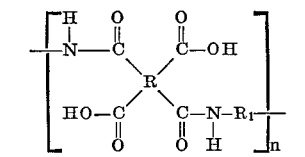

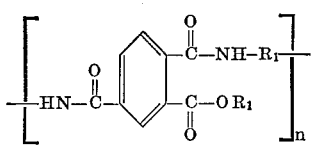

and

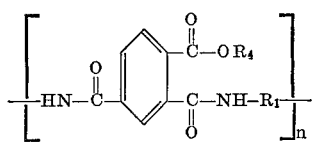

wherein $n$ is at least 15, R is at least one tetravalent organic radical selected from the group consisting of:

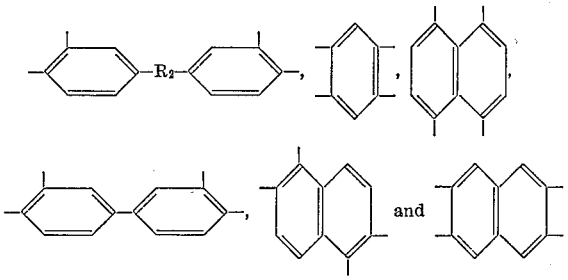

$R_2$ being selected from the group consisting of divalent aliphatic hydrocarbon radicals having from 1 to 4 carbon atoms and carbonyl, oxy, sulfo and sulfonyl radicals, $R_1$ is at least one divalent radical selected from the group consisting of:

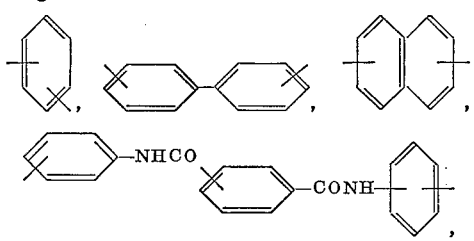

and

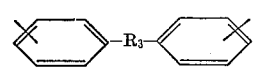

in which $R_3$ is a divalent organic radical selected from the group consisting of $R_2$, silico and amido radicals and in which $R_4$ is selected from the group consisting of: —H, alkyl and aryl radicals.

8. The method of claim 7 wherein the solvent for the acid is selected from the group consisting of N,N-dialkyl-carboxylamides, dimethyl sulfoxide pyridine and mixtures thereof.

9. The method of claim 7 including replenishing the bath with electrodeposition composition and wherein the composition also contains filler particles.

10. An electrical conductor electrocoated with a cured polyimide film by the method of claim 7.

11. A method of coating a metallic electrical conductor comprising the steps of:
    (A) continuously passing a positively charged electrical conductor near a negatively charged electrode in a bath of a conducting non-aqueous polyamic acid electrodeposition solution, said electrodeposition solution comprising acid salt within a solvent mixture, said acid salt being the reaction product of a polyamic acid and a basic organic nitrogen containing compound, said electrodeposition solution comprising about 1 part by weight polyamic acid, about 0.8 to about 1.5 parts by weight basic organic nitrogen containing compound, about 12.5 to about 15.5 parts by weight non-aqueous, organic solvent for the acid and about 7 to about 9 parts by weight non-aqueous, organic, non-solvent for the salt, wherein the current density between the conductor and the negative electrode is sufficient to electrodeposit a coating on the conductor, and
    (B) curing the coating to form a polyimide film on the conductor.

12. The method of claim 11 wherein the continuously moving conductor passes by the negative electrode for about 8 to about 20 seconds, the current density is between about 2 to 10 mA./sq. in. of negative electrode surfaces plus conductor surface opposite the negative electrode, the pH of the bath is between about 8-10 and the solvent for the acid, non-solvent for the salt and basic nitrogen containing compound are non-electrolizable.

13. The method of claim 12 wherein the coating is cured by passing the conductor through a hot air oven at an initial temperature of about 250°–325° F. and a final temperature between about 699°–875° F.

14. The method of claim 12 wherein the negative electrode comprises two connected plates mounted about 0.5″–4.0″ apart and connected to a D.C. power supply means.

15. The method of claim 11 wherein the nitrogen containing compound is selected from the group consisting of amines and imidazoles, non-solvent for the salt is a ketone, and the coating is cured by passing the conductor through a heat source to heat the coating.

16. The method of claim 1 wherein the basic organic nitrogen containing compound is selected from the group consisting of trimethylamine, triethylamine, N,N-dimethylbenzylamine, tri-n-propylamine, tri-n-butylamine, N-ethylpiperidine, N-allylpiperidine, N-ethylmorpholine, N,N-diethyl-m-toluidine, N,N-diethyl-p-toluidine, N-allylmorpholine, N,N-diethylaniline pyridine, imidazole, 1-methylimidazole, 4-methylimidazole, 5-methylimidazole, 1-propylimidazole, 1,2-dimethylimidazole, 1-ethyl-2-methylimidazole and 1-phenylimidazole and the non-solvent for the salt is selected from the group of ketones consisting of acetone, methyl isobutyl ketone, methyl ethyl ketone, methyl n-propyl ketone, dimethyl ketone, mesityloxide, cyclohexanone, methyl-n-butyl ketone, ethyl-n-butyl ketone, methyl-n-amylketone, acetophenone, methyl-n-hexyl ketone, isophorone and di-isobutyl ketone.

17. The method of claim 15 wherein the polyamide acid is selected from the group of polyamide acids having the structure:

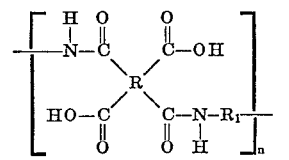

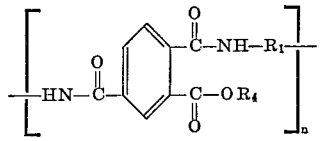

and

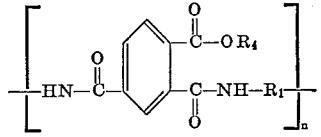

wherein $n$ is at least 15, R is at least one tetravalent organic radical selected from the group consisting of:

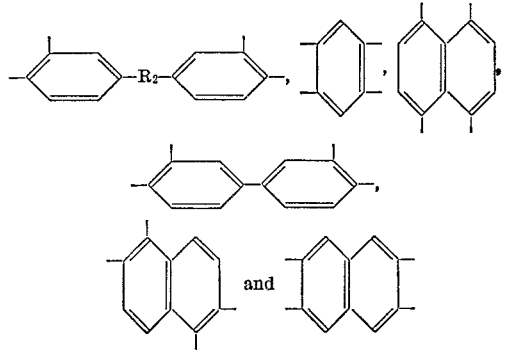

$R_2$ being selected from the group consisting of divalent aliphatic hydrocarbon radicals having from 1 to 4 carbon atoms and carbonyl, oxy, sulfo and sulfonyl radicals, $R_1$ is at least one divalent radical selected from the group consisting of:

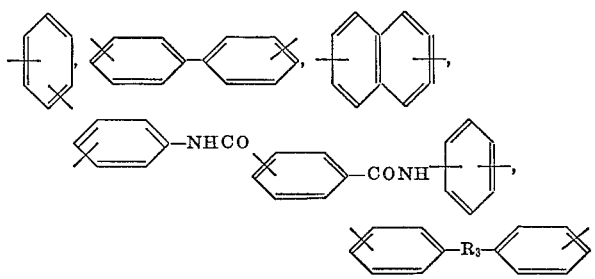

and in which $R_3$ is a divalent organic radical selected from the group consisting of $R_2$, silico and amido radicals and in which $R_4$ is selected from the group consisting of: —H, alkyl and aryl radicals.

18. The method of claim 17 wherein the solvent for the acid is selected from the group consisting of N,N-dialkylcarboxylamides, dimethyl sulfoxide, pyridine and mixtures thereof.

19 The method of claim 17 also including replenishing the bath with electrodeposition composition and wherein the composition also contains filler particles.

20. An electrical conductor electrocoated with a cured polyimide film by the method of claim 17.

References Cited
UNITED STATES PATENTS
3,663,728    5/1972    Haback et al. _____ 204—181

HOWARD S. WILLIAMS, Primary Examiner